United States Patent
Okita et al.

(10) Patent No.: US 6,659,909 B2
(45) Date of Patent: Dec. 9, 2003

(54) TOROIDAL CONTINUOUSLY VARIABLE TRANSMISSION AND MANUFACTURING METHOD THEREOF

(75) Inventors: Shigeru Okita, Fujisawa (JP); Tomonobu Yoshikawa, Fujisawa (JP); Yutaka Ishii, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/194,676

(22) Filed: Jul. 11, 2002

(65) Prior Publication Data

US 2003/0040401 A1 Feb. 27, 2003

Related U.S. Application Data (63) Continuation of application No. PCT/JP01/09875, filed on Nov. 12, 2001.

(30) Foreign Application Priority Data

Nov. 13, 2000 (JP) ........................................ 2000-345206

(51) Int. Cl.[7] ............................................... F16H 55/32
(52) U.S. Cl. ........................................... 476/73; 476/40
(58) Field of Search ............................. 476/40, 72, 73; 148/328

(56) References Cited

U.S. PATENT DOCUMENTS 6,066,068 A  5/2000  Takemura et al.
6,447,619 B1 * 9/2002 Takayama et al. .......... 148/219
2002/0082133 A1 * 6/2002 Yoshikawa et al. ........... 476/46

FOREIGN PATENT DOCUMENTS

| JP | 7-71555 | 3/1995 |
| JP | 10-231908 | 9/1998 |
| JP | 11-210854 A | 8/1999 |
| JP | 2001-82566 | 3/2001 |

* cited by examiner

Primary Examiner—David Fenstermacher
(74) Attorney, Agent, or Firm—Christensen O'Connor Johnson Kindness PLLC (57) ABSTRACT

A toroidal continuously variable transmission system of the present invention is provided with an input disk, an output disk and power rollers. The input and output disks have traction surfaces defined between a small-diameter portion and a large-diameter portion and having an arc-shaped concave section. The input and output disks are coaxially arranged in such a manner that the traction surfaces face each other. The power roller are frictionally engagement with the traction surfaces of the input and output disks and transmit a driving force. At least one of the input disk, the output disk and the power rollers is formed of an alloy steel which contains 0.15 to 2.0% by weight of Mo. The alloy steel is subjected first to carburization or carbonitriding processing executed at a temperature not lower than 1,000° C., and then to hardening and tempering. The alloy steel has a surface carbon content of 0.8 to 1.4%.

6 Claims, 6 Drawing Sheets

TOROIDAL CONTINUOUSLY VARIABLE TRANSMISSION AND MANUFACTURING METHOD THEREOF

CROSS REFERENCE TO RELATED APPLICATIONS

This is a Continuation Application of PCT Application No. PCT/JP01/09875, filed Nov. 12, 2001, which was not published under PCT Article 21(2) in English.

This application is based upon and claims the benefit of priority from the prior Japanese Patent Application No. 2000-345206, filed Nov. 13, 2000, the entire contents of which are incorporated herein by reference.

BACKGROUND OF THE INVENTION

1. Field of the Invention

The present invention relates to a toroidal continuously variable transmission and a method of manufacturing the same. More specifically, the present invention relates to a toroidal continuously variable transmission designed for use in a vehicle, such as an automobile, and a method for manufacturing the same.

2. Description of the Related Art

Figure 1:
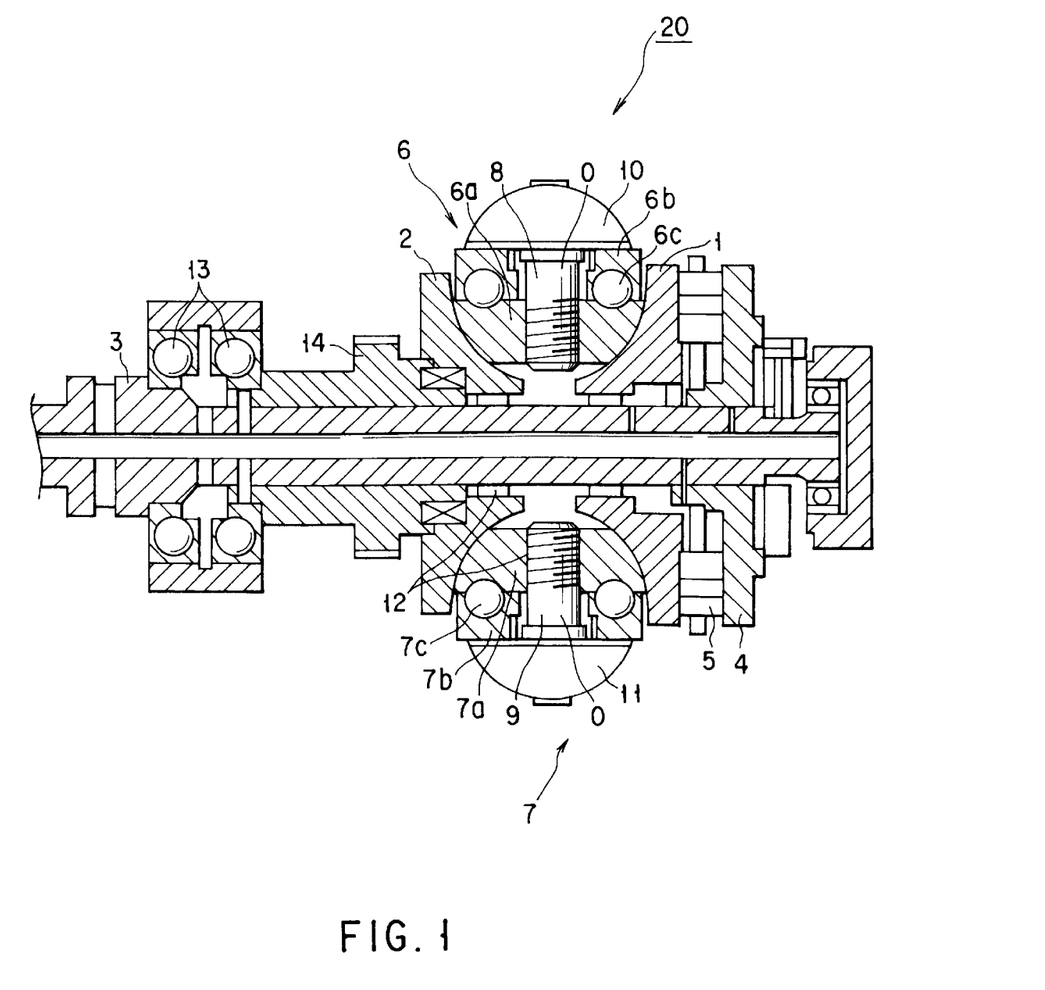
FIG. 1 is an explanatory view of a toroidal continuously variable transmission.

As a toroidal continuously variable transmission, the one shown in FIG. 1 has been conventionally known.

Inside a housing (not shown), an input disk 1 and an output disk 2 are coaxially arranged in such a manner that they face each other. An input shaft 3 extends through the axis of the toroidal transmission including the input and output disks 1 and 2. A loading cam 4 is disposed at one end of the input shaft 3. The loading cam 4 is configured to transmit the driving force (torque) of the input shaft 3 to the input disk 1 through a cam roller 5.

The input and output disks 1 and 2 are substantially similar in shape and arranged to be symmetric. The facing surfaces of these disks are toroidal surfaces and jointly form substantial semicircles when viewed in a section taken axially. A pair of power roller bearings 6 and 7, which are in contact with the input and output disks 1 and 2, are inserted into toroidal cavities defined by the toroidal surfaces of the input and output disks 1 and 2.

Power roller bearing 6 includes a power roller 6a which rolls on the toroidal surfaces of the input and output disks 1 and 2 (and which corresponds to an inner ring of the power roller bearing 6), an outer ring 6b and a plurality of rolling members (steel balls) 6c. The other power roller bearing, i.e., power roller bearing 7, includes a power roller 7a which rolls on the toroidal surfaces of the input and output disks 1 and 2 (and which corresponds to an inner ring of the power roller bearing 7), an outer ring 7b and a plurality of rolling members (steel balls) 7c.

As can be seen from the above, the power roller 6a functions as the inner ring that is a structural element of the power roller bearing 6, and the power roller 7a functions as the inner ring that is a structural element of the power roller bearing 7. The power roller 6a is rotatably coupled to a trunnion 10 by means of a pivot 8, the outer ring 6b and the rolling members 6c, and at the same time can be inclined in such a manner that a pivot axis O, which is the center of the toroidal surfaces of the input and output disks 1 and 2, is the center of the inclining movement.

Likewise, power roller 7a is rotatably coupled to a trunnion 11 by means of a pivot 9, outer ring 7b and rolling members (steel balls) 7c, and at the same time can be inclined in such a manner that a pivot axis O, which is the center of the toroidal surfaces of the input and output disks 1 and 2, is the center of the inclining movement. A lubricant having a great viscosity or friction resistance is supplied onto the surfaces of the input and output disks 1 and 2 and those of the power rollers 6a and 7a. A driving force exerted on the input disk 1 is transmitted to the output disk 2 through a lubricant film and the power rollers 6a and 7a.

The input and output disks 1 and 2 are independent of the input shaft 3 by means of a needle 12 interposed between them (that is, the input and output disks 1 and 2 move without reference to the rotating shaft 3). The output disk 2 is connected to an output shaft 14 which is parallel to the input shaft 3 and is rotatably supported by a housing (not shown) by means of angular members 13.

In the toroidal continuously variable transmission 20, the driving force of the input shaft 3 is transmitted to the loading cam 4. When the driving force, thus transmitted, rotates the loading cam 4, the rotation is transmitted to the input disk 1 through the cam roller 5, thereby rotating the input disk 1. The driving force based on the rotation of the input disk 1 is transmitted to the output disk 2 by way of the power roller 6a and the power roller 7a. As a result, the output disk 2 rotates together with the output shaft 14.

At the time of transmission, the trunnions 10 and 11 are moved a little toward the pivot axes O. By moving the trunnions 10 and 11 toward the axes, the intersection between the axis of rotation of the power rollers 6a and 7a and the axis of the input and output disks 1 and 2 is shifted slightly from the original position. As a result, the circumferential velocity of the rotation of the power rollers 6a and 7a and that of the rotation of the input disk 1 become off balance, and part of the torque of the input disk 1 serves to rotate the power rollers 6a and 7a around the pivot axes O. As a result, the power rollers 6a and 7a slide and incline on the curved surfaces of the input and output disks 1 and 2.

When the toroidal continuously variable transmission is driven, high contract pressure tends to act between the input and output disks 1 and 2 on one hand and the power rollers 6a and 7a on the other hand, and the maximal value of the contact pressure is as high as 4 Gpa or thereabouts. In addition to this problem, the bearing surfaces of the power rollers 6a and 7a are also exerted with high pressure per unit area, and may peel off in a short time.

Under the circumstances, peeling or damage to the traction portions of the toroidal surfaces of the input and output disks 1 and 2, those of the power rollers 6a and 7a, and those of the power rollers 6a and 7a must be prevented for increasing reliability. In addition, since the input and output disks 1 and 2 and the power rollers 6a and 7a must repeatedly undergo bending stress, fatigue cracking tend to occur. The input and output disks 1 and 2 and the power rollers 6a and 7a must be improved so that they hardly suffer fatigue and can withstand long use against a bending stress.

Jpn. Pat. Appln. KOKAT Publication No. 7-71555 is intended to provide a toroidal continuously variable transmission wherein the traction surfaces of input and output disks and those of power rollers have an improved rolling-resistant life, and wherein the input and output disks and the power rollers have an improved anti-fatigue cracking life. To attain this object, the disks and the power rollers are subjected to carbonitriding and grinding. Alternatively, they are subjected to carbonitriding and grinding, and are further processed in such a manner that at least either the disks or the power rollers have a hardened layer whose effective depth is not less than 2.0 mm and not more than 4.0 mm.

According to Jpn. Pat. Appln. KOKAI Publication No. 2001-82566, at least one of an input disk, an output disk and a power roller is formed of medium carbon steel having a carbon content of 0.3% to 0.5%, and is subjected to carburization or carbonitriding processing and further to hardening and annealing so that the hardness of the core portion is not less than HRC35. By this processing, an improved life against fatigue is attained.

However, the disks and power rollers are improved by carburization executed at a temperature in the range of 920 to 960° C. or by carbonitriding processing executed at a temperature in the range of 930 to 950° C., and this process is continued 20 to 30 hours. After the heat treatment, therefore, a large-sized carbide or carbonitride is undesirably formed in the metal structure of the disks and power rollers. Since this carbide or carbonitride degrades the fatigue strength of the disks and power rollers, the formation of such a substance must be prevented. In the case of a traction drive such as a toroidal continuously variable transmission, the traction force exerted on the rolling surfaces gives rise to a tangential force. If a carbide or carbonitride is present in a crystalline grain boundary, a stress tends to concentrate at such a position, causing cracks. As a result, peeling or fracture may occur.

BRIEF SUMMARY OF THE INVENTION

The present invention has been conceived to solve the above problems, and is intended to provide a toroidal continuously variable transmission which has an improved life against fatigue by producing minute particles of carbide or carbonitride and which reduces the heat treatment cost by shortening a carburization or carbonitriding processing time. The present invention is also intended to provide a method for manufacturing the toroidal continuously variable transmission.

To achieve this object, the toroidal continuously variable transmission system of the present invention comprises: an input disk and an output disk which have traction surfaces defined between a small-diameter portion and a large-diameter portion and having an arc-shaped concave section and which are coaxially arranged such that the traction surfaces face each other; and power roller which are frictionally engagement with the traction surfaces of the input and output disks and transmit a driving force, characterized in that at least one of the input disk, the output disk and the power rollers is formed of an alloy steel which contains 0.15 to 2.0% by weight of Mo, which is subjected first to carburization or carbonitriding processing executed at a temperature not lower than 1,000° C. and then to hardening and tempering, and which has a surface carbon content of 0.8 to 1.4%.

The toroidal continuously variable transmission of the present invention is characterized in that a surface nitrogen concentration is in the range of 0.04 to 0.3%

The invention is characterized in that at least one of the input disk, the output disk, and the power roller and outer ring of a power roller bearing has a carbon content equal or more than 0.3% and equal or less than 0.5%.

The method of the present invention is applied to the manufacture of a toroidal continuously variable transmission comprising: an input disk and an output disk which have traction surfaces defined between a small-diameter portion and a large-diameter portion and having an arc-shaped concave section and which are coaxially arranged such that the traction surfaces face each other; and power roller which are frictionally engagement with the traction surfaces of the input and output disks and transmit a driving force, characterized in that the method comprises: forming at least one of the input disk, the output disk and the power rollers by use of an alloy steel which contains 0.15 to 2.0% by weight of Mo; executing carburization or carbonitriding processing at a temperature not lower than 1,000° C.; then executing hardening and tempering, such that a surface carbon content is within the range of 0.8 to 1.4%.

The invention described above is characterized in that a surface nitrogen concentration is in the range of 0.04% to 0.3%.

The invention described above is characterized in that at least one of the input disk, the output disk, and the power roller and outer ring of a power roller bearing has a carbon content equal or more than 0.3% and equal or less than 0.5%.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The toroidal continuously variable transmission of the present invention will now be described in more detail.

The toroidal continuously variable transmission undergoes both a rolling stress and a bending stress. In this case, cracking may occur from a nonmetallic intervening object or the like existing in a stress region, and in the worst case the rolling surfaces may peel off or fracture. It is therefore thought that in stressed regions, a residual compressive stress and a hardness are greatly dependent on the fatigue strength.

SUJ2 is a material which has been most often used for forming a rolling bearing or a similar rolling member. This material can be provided with a hardness the rolling member requires to attain a desired life by merely executing hardening and annealing. The material, however, does not provide a residual compressive stress in the surface portion and, in some cases, results in a bending stress being generated.

In order to provide a hardness the rolling member requires to attain a desired life and at the same time enhance the residual compressive stress (which helps improve the strength against fracture), the input disk, the output disk and the power rollers must be subjected to surface treatment, such as carburization, or carbonitriding processing. Moreover, in order to prevent fatigue fracture from occurring at the position corresponding to a maximal shearing stress when an intense contact stress is generated, carburization or carbonitriding processing has to be executed for a long time, thereby increasing the hardness even at deep positions from the surface. Such treatment significantly increases the cost in comparison with the case where SUJ2 is used as it is.

In U.S. Pat. No. 2,590,645, the inventors show that carbonitriding processing is preferable to carburization because the execution of only the latter does not provide a sufficient long life against fracture and peeling. They also show that the carbonitriding processing should be preferably followed by hardening because the execution of hardening deposits minute particles of carbonitride and produces an optimal amount of residual austenite.

In Jpn. Pat. Appln. KOKAI Publication No. 6-341441, the present inventors state that the execution of carbonitriding processing at a temperature of 900° C. or higher forms a deeper carbonitride layer and that decreasing a nitrogen content gradient improves grinding workability and productivity and controls the cost for heat treatment. However, the carbonitriding processing at a temperature exceeding 980° C. does not necessarily ensure high performance because the amount of nitrogen contained in the surface portion of a finished product is insufficient, and inevitably requires large-scale equipment. A factor giving rise to this disadvantage is that the nitrogen potential for solid-solubilizing nitrogen is substantially zero at high temperature. Another factor may be a processing time. To be more specific, in high-temperature carbonitriding processing, the low nitrogen potential hinders the impregnation of nitrogen, while the high processing temperature accelerates impregnation and diffusion of carbon and therefore shortens the processing time. This also makes the impregnation of nitrogen more difficult, and the carbonitriding processing is considered impossible eventually.

In an effort to shorten the processing time, the present inventors conducted experiments wherein carbonitriding processing was executed at a high temperature exceeding 1,000° C., and discovered that carbonitriding processing could be successfully executed at such a high temperature. A factor leading to this success lay in ingredients. The present inventors executed carbonitriding processing at a high temperature of 1,000° C. or higher, using additives of different ingredients, and confirmed that the inclusion of Mo would remarkably increase the nitrogen content.

Figure 8:
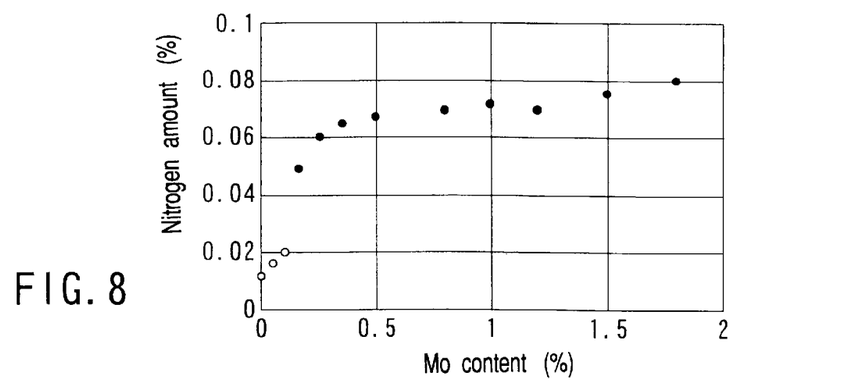
FIG. 8 is a graph showing how an Mo content is related to a life with respect to each structural component of the toroidal continuously variable transmission of the present invention.

FIG. 8 shows nitrogen content measurements made in carbonitriding processing executed at a high temperature of 1,000° C. or higher. As can be seen, it was ascertained that the addition of Mo enabled successful carbonitriding processing even when the processing temperature was low and did not allow the impregnation of nitrogen. This is attributed to the fact that Mo increases the solid-solubility of nitrogen and decreases the activity. (Refer to "Alloy Elements of Steel", First Volume, Ed. Japan Society for the Promotion of Science, (Japan: Seibunndo-shinkousha [transliterated], 1971) p. 544.)

A toroidal continuously variable suspension undergoes both a rolling stress and a tensile stress, and cracking may occur from a nonmetallic intervening object existing in a stress region or the like. In some cases, the cracking may result in the rolling surfaces peeling off or fracture. A check was made to confirm the effects the amount of nitrogen in the surface portion might have under these conditions.

Figure 9:
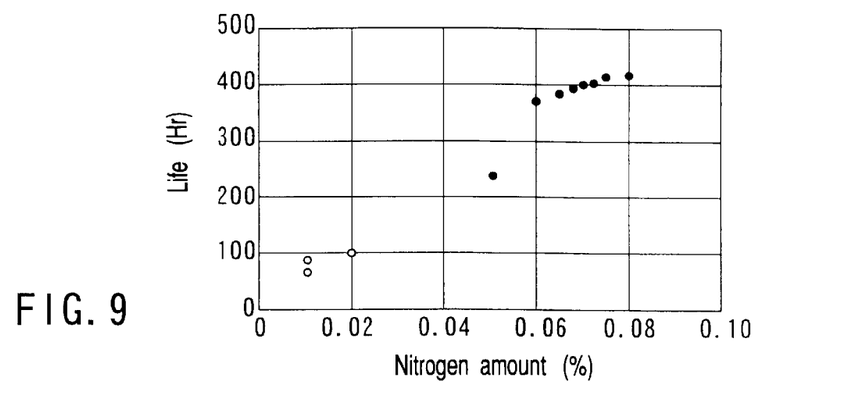
FIG. 9 is a graph showing how a carbon content and an estimated maximal-size intervening object are related to each other.

An input disk, an output disk and a power roller were manufactured by using materials subjected to carbonitriding processing at 1,000° C. or higher and containing different nitrogen contents in the surface portions, and a life test was conducted. FIG. 9 shows results of this life test. As can be seen, the surface nitrogen content should be not less than 0.04% since a nitrogen content in this range ensures a stable life despite simultaneous exertion of a rolling stress and a bending stress. The surface nitrogen content should preferably be not less than 0.06%.

If the surface nitrogen content exceeds 0.3%, the input disk, output disk and power roller cannot be worked with ease, and the workability is markedly degraded especially in the grinding step of the manufacturing process, resulting in poor productivity. This is why the surface nitrogen content should be not higher than 0.3%.

To shorten the carbonitriding processing time, the carbon content in a raw material should be high. Therefore, the carbon content is preferably set at a large value in the range of 0.3% to 0.5%.

The rolling surfaces may peel off or fracture, with an intervening object as a starting point. In connection with this, it should be noted that the size and amount of intervening objects have significant effects on the fatigue strength. In other words, the larger the size and amount of the intervening objects are, the more the fatigue strength is degraded. This fact is well known in the art. The researches made to date show that a nonmetallic intervening object, especially an oxide object, tends to cause cracking. This being so, steel manufacturers have long made an effort to reduce the amount of nonmetallic intervening objects contained in steel.

For example, "Bearing Steel", Technical Bulletin of Sanyo Special Steel Co., Ltd., Vol. 5, No., 1997, shows the relationships between the rolling-resistant life and the amount of oxygen in steel. The results shown in this publication indicate that a reduction in the amount of oxygen in steel lengthens the life. "Developments In Steel Manufacturing Technology Of Our Firm", Technical Bulletin of Sanyo Special Steel Co., Ltd., Vol. 4, No. 1, 1997, shows how the oxygen content in steel is reduced in the years from 1965 to 1990, and it can be seen from this publication that the rolling-resistant life is improved in relation to the reduction of oxygen in steel by the steel manufacturer. "EP Steel (Steel For Superlong-Life And Highly-Reliable Bearing)", NSK Technical Journal, No. 652, 1992, focuses on the size and distribution of intervening objects. The NSK Technical Journal shows that the size and distribution of nonmetallic objects in steel are controlled to be small values at the time of manufacture, and that this control improves not only the rolling-resistant life but also the fatigue strength despite rotating and bending motions, even if the oxygen content in steel remains at the same level.

Reduction of the amount of oxygen in steel has been attempted by introducing new steel manufacturing technology. The basic reaction for this reduction is a chemical reaction between carbon and oxygen. The larger the amount of carbon is, the more reaction with the oxygen in steel takes place. As a result, the amount of oxygen contained in steel can be reduced. It can therefore be concluded that the amount of oxygen in steel increases with a decrease in the amount of carbon in a raw material.

Figure 10:
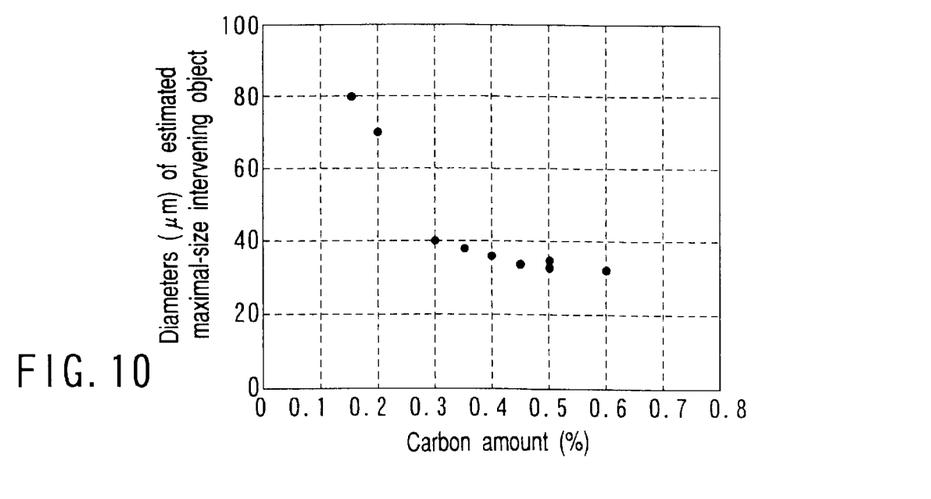
FIG. 10 is a graph showing how the diameter of the estimated maximal-size intervening object is related to a carbon content with respect to each structural component of the toroidal continuously variable transmission of the present invention.

As shown in FIG. 10, the present inventors discovered that when the amount of carbon contained in steel was 0.3% or more, oxide-based nonmetallic intervening objects were not much distributed in a raw material and that the diameter of maximal-size intervening objects in steel, which was estimated based on the extreme-value statistical process, decreased. For this reason and in order to shorten the carburization time, the amount of carbon in the raw material should be 0.3% or more.

Figure 12:
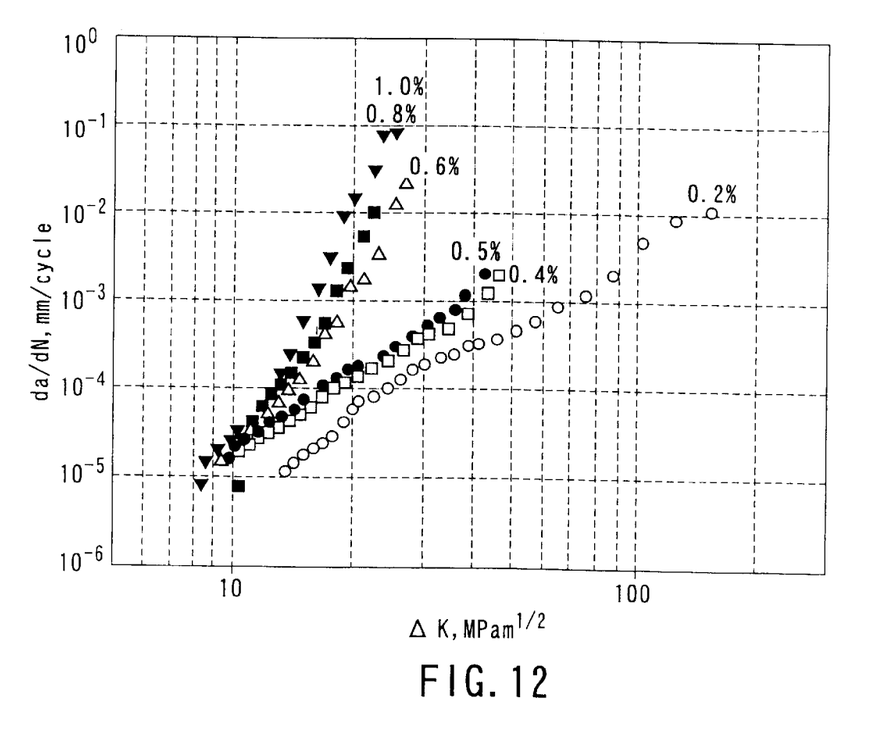
FIG. 12 is a graph how cracking occurs in relation to the carbon content.

With respect to the phenomenon wherein cracking occurs with a nonmetallic intervening object as a starting point and may result in the rolling surfaces peeling off or fracture, the fatigue crack growth rate must be considered as one of important factors. The fatigue crack growth rate determines the speed from the occurrence of cracking to that of fracture. FIG. 12 shows measurements of the fatigue crack growth rate in relation to the carbon content in the raw material. As can be seen, the fatigue crack growth rate significantly increased when the carbon content in steel exceeded 0.5%. Based on this finding, the upper limit of the carbon content in the raw material was set at 0.5%.

As can be seen from the above, a toroidal continuously variable transmission can have a long life by using medium carbon steel whose carbon content in the raw material is equal or more than 0.3% and equal or less than 0.5%.

The present inventors made researches about how the carburization or carbonitriding processing should be executed to prevent the generation of large oxides and carbonitrides.

In order to attain a predetermined carburization depth in carburization or carbonitriding processing, the carburization processing should be executed at high temperature, and the higher the processing is, the shorter the processing time becomes. However, the high-temperature carburization processing increases the size of crystalline grains and decreases the ratio of the grain boundary to the micro structure. Accordingly, the carbides and carbonitrides are generated concentratedly at the grain boundary. Since, therefore, the carbides and carbonitrides can easily grow, the fatigue strength may be degraded. Under the circumstances, the disks and power rollers of the prior art continuously variable transmission are manufactured by executing carburization or carbonitriding processing at a temperature in the range of 930 to 960° C., because processing at a temperature in this range is free from the above problems though it is disadvantageous in light of the heat treatment efficiency.

However, the present inventors discovered that minute particles of carbide were produced, when the processing temperature was set at 1,000° C. or higher to shorten the processing time and the Mo content in alloy steel was set at a predetermined value to suppress the generation of the carbide and carbonitride. It was generally thought that Mo was a carbide-forming element and would increase the grain size of carbides. However, the present inventors discovered that the execution of carburization at 1,000° C. or higher would produce minute particles of carbide. This phenomenon is attributed to the fact that Mo has a strong affinity for C (carbon), and Mo in the neighborhood of the grain boundary serves to take carbide or carbonitride into the inside of particles, resulting in a reduction in the size of carbide and carbonitride.

It has been conventionally thought that ammonia rapidly decomposes at a temperature of 1,000° C. or higher and nitriding processing at such a high temperature is hard to execute. It was found out, however, that the inclusion of 0.15 to 2.0% by weight of Mo in the alloy enabled that nitriding processing.

The nitrogen distributed in the alloy produces a carbonitride, but this carbonitride is in the form of very minute particles. In comparison with the case where carburization is executed at 1,000° C. or higher, the particles of carbide or carbonitride are advantageously very minute. This phenomenon is attributable to the fact that the growth of carbide or carbonitride is slower when different kinds of elements (such as C and N) exist than when a single element (namely C) exists.

Carburization executed at high temperature tends to produce a boundary-grain oxide in the surface layer. However, since the existence of nitrogen serves to decrease the activity of oxygen, the generation of the boundary-grain oxide is suppressed in practice.

As can be seen from the above, where carburization or carbonitriding processing is executed at 1,000° C. or higher in the presence of Mo, Mo serves to produce minute particles of carbide or carbonitride in the surface portion. Hence, it is possible to manufacture disks and power rollers that have an improved fatigue strength. The fatigue strength can be further improved by setting the grain size of the surface portion at 8 (JIS) or greater. The carburization temperature should be not higher than 1,100° C. since carburization executed at a temperature higher than this produces large crystalline grains, adversely affecting the fatigue strength.

The disks and power rollers of the present invention will now be described in detail in terms of carbon content, nitrogen content and kinds of alloy steel.

The surface carbon content must be 0.8% or greater so as to provide the tracking surfaces of the disks and power rollers with a long life against rolling fatigue. If the surface carbon content exceeds 1.4%, the carbide at the grain boundary is inevitably large in the surface layer, particularly the surface layer portion which supports a rolling load.

The surface nitrogen content is related to the advantage of producing minute particles of carbide or carbonitride when carbonitriding processing is executed at 1,000° C. or higher. The surface nitrogen content is also related to the advantage of suppressing the generation of a grain-boundary oxide layer. To attain these advantages, the surface nitrogen content must be 0.04% or higher. However, the nitrogen content should not be higher than 0.3%, because the nitrogen content higher than this adversely affects the workability and the resultant increase in the amount of C and N gives rise to large-sized particles of carbonitride, and further degrades the fatigue strength.

Mo, which is one component of the alloy steel, is related to the advantage of producing minute particles of carbide and carbonitride when carburization or carbonitriding processing is executed at 1,000° C. or higher. Mo is also related to the advantage of enabling nitriding processing, which is hard to execute at 1,000° C. or higher in the prior art. To attain these advantages, the amount of Mo contained should be 0.15% by weight or more.

If the Mo content is less than 0.15% by weight, it is not possible to expect minute particles of carbide or carbonitride. On the other hand, if the Mo content exceeds 2.0% by weight, the size of the particles of carbide and carbonitride tends to increase. In consideration of the balance between these, it is preferable that the Mo content be in the range of 0.15 to 0.35% by weight.

The C content in the alloy steel with which to form the disks and power rollers should not be less than 0.3%. If it is, an oxide-based nonmetallic intervening object, which has an adverse effect on the life against bending fatigue, is hard to remove at the time of manufacture. The C content should not exceed 0.5%. If it does, the fatigue crack growth rate becomes high, so that the life against fatigue cracking may be adversely affected.

The alloy steel with which to form the disks and power rollers should contain not only Mo and Co, described above, but also Si, Mn and Cr in predetermined amounts, as will be described below.

Since Si is required as a deoxidizer when steel is manufactured, it is added in an amount of 0.1% or more. Even if an extra amount of Si is added, the effect saturation occurs, and the forgeability and the grindability are adversely affected. For this reason, the Si content is preferably not more than 2.0%.

Mn functions as a deoxidizer when steel is manufactured. In addition to this, it is an element that improves the hot-workability of steel and ensures reliable quenching characteristics. To improve the hot-workability of steel and ensure reliable quenching characteristics, therefore, Mn is added in an amount of 0.5% or more. However, if an excessive amount of Mn is added, the grindability of the raw material is degraded, and the raw material cannot be easily formed or shaped into a rolling member. For this reason, the upper limit of the Mn content range is 2.0%.

Cr is an element that increases the amount of carbide or carbonitride which is deposited in the carburization or carbonitriding processing. When Cr is added in an amount of 0.5% or more, the amount of carbide deposited increases, the hardness of the outermost layer increases, and the life against rolling fatigue further improves under the condition where foreign matter is included. However, if an excessive amount of Cr is added, the workability is adversely affected. For this reason, the upper limit of the Cr content is 2.0%.

Examples according to the present invention will now be described.

EXAMPLES 1–51

The fundamental structure of the toroidal continuously variable transmission of the present invention is similar to the structure shown in FIG. 1. That is, at least one of the input disk, the output disk, and the power roller and outer ring of the power roller bearing is formed of an alloy steel which contains 0.15 to 2.0% by weight of Mo, and which is subjected to carburization or carbonitriding processing executed at a temperature not lower than 1,000° C. The nitrogen content in the surface portion of the finished product is equal to, or greater than 0.04 and less than 0.3%.

Input disks, output disks, power rollers and outer rings of power roller bearings were manufactured using SCM415, SCM420, SCM430, SCM435, SCM440, SCM445, SCM445 with an increased carbon content of 0.6%, and SCM435 with varied Mo contents.

Of these, the raw-material members which were to be worked as input disks and had different carbon contents were cut and ground. To examine nonmetallic objects, maximal-size intervening objects were estimated based on the extreme-value statistical process. An estimated maximal-size intervening object was measured in an area of 100 mm$^2$, and 30 samples were examined using a microscope. In other words, the diameter of an estimated maximal-size intervening object was obtained based on a total area of 30,000 mm$^2$. FIG. 10 shows estimated maximal-size intervening object diameters that were calculated from the carbon contents of the raw materials on the basis of the extreme-value statistical process. As can be seen, intervening objects become smaller when the carbon content is increased from 0.2% to 0.3%.

Figure 11:
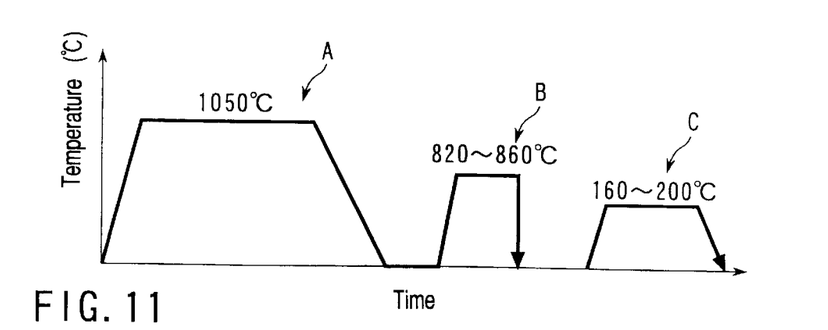
FIG. 11 is a graph showing the heat treatment characteristics of each structural component of the toroidal continuously variable transmission of the present invention.

Thereafter, the manufactured members, namely the input disks, output disks, power rollers and outer rings were subjected to heat treatment, such as carbonitriding processing. The heat treatment is high-temperature carbonitriding processing executed at 1,050° C., as shown in FIG. 11. In FIG. 11, Step A is carbonitriding processing executed under the conditions wherein the Rx gas is 18 m$^3$/hr, the carbon potential is 1.0 to 1.2%, and the remaining amount of ammonia is 0.01 to 0.1%. Step B is hardening, and Step C is annealing. After the heat treatment, the surfaces of the manufactured members were polished by mechanical working, such as grinding.

Needless to say, the diameters of estimated maximal-size intervening objects calculated with respect to the raw-material members hold true with the completed products as well.

Since the estimation method is described in detail in Akinobu [Transliterated] Murakami, Effects by Minute Defects and Intervening Objects, (Japan: K.K. Youken-Doh [transliterated], Mar. 8, 1993), reference to the method will be omitted herein.

CVTs were assembled using the input disks, output disks, power rollers and outer rings described as above, and were subjected to an endurance test. The input shafts were rotated by a dynamometer, and torque was applied by the dynamometer attached to the output shafts. The test conditions were as follows:

Test Conditions

Rotating Speed: 4,000 r.p.m.
output Torque: 500 Nm
Lubrication: Traction Oil
Oil Temperature: 100° C.
Speed Change Ratio: 2.0
Outer Diameter: 140φ

In the test the vibration of CVT units was monitored, and the test was continued until the vibration exceeded the predetermined level. As for CVT units whose vibration did not increase, the test was stopped when 800 hours have passed. After the test, the disks and power rollers were examined to check the broken conditions. The test results are shown in Tables 1 and 2 below. In Table 2, comparative examples 1–9 are shown with respect to their materials, Mo contents, surface nitrogen contents, test times, broken parts, broken states, and diameters of start-position intervening objects.

TABLE 1

|  | Materials | | Surface | | | | Diameters of |
|---|---|---|---|---|---|---|---|
|  | Material names | Mo contents (%) | nitrogen contents (%) | Test times (hr) | Broken part | Broken states | start-position intervening objects (μm) |
| Example 1 | SCM415 | 0.21 | 0.063 | 667 | Input disk | Fracture | 68 |
| Example 2 | SCM415 | 0.21 | 0.063 | 518 | Output disk | Fracture | 76 |
| Example 3 | SCM415 | 0.21 | 0.063 | 506 | Power roller | Fracture | 78 |
| Example 4 | SCM415 | 0.21 | 0.063 | 495 | Output disk | Fracture | 78 |
| Example 5 | SCM420 | 0.20 | 0.060 | 526 | Output disk | Fracture | 64 |
| Example 6 | SCM420 | 0.20 | 0.060 | 615 | Output disk | Fracture | 70 |
| Example 7 | SCM420 | 0.20 | 0.060 | 632 | Power roller | Fracture | 62 |
| Example 8 | SCM420 | 0.20 | 0.060 | 506 | Input disk | Fracture | 75 |
| Example 9 | SCM430 | 0.18 | 0.040 | 733 | Power roller | Peeling | None |
| Example 10 | SCM430 | 0.18 | 0.040 | 735 | Output disk | Peeling | None |
| Example 11 | SCM430 | 0.18 | 0.040 | 621 | Input disk | Peeling | None |
| Example 12 | SCM430 | 0.18 | 0.040 | 800 | None | | |
| Example 13 | SCM435 | 0.15 | 0.050 | 800 | None | | |
| Example 14 | SCM435 | 0.15 | 0.050 | 553 | Power roller | Peeling | None |
| Example 15 | SCM435 | 0.15 | 0.050 | 550 | Power roller | Peeling | None |
| Example 16 | SCM435 | 0.25 | 0.060 | 800 | None | | |
| Example 17 | SCM435 | 0.25 | 0.060 | 800 | None | | |
| Example 18 | SCM435 | 0.25 | 0.060 | 703 | Power roller | Peeling | None |
| Example 19 | SCM435 | 0.35 | 0.065 | 800 | None | | |
| Example 20 | SCM435 | 0.35 | 0.065 | 800 | None | | |
| Example 21 | SCM435 | 0.35 | 0.065 | 756 | Power roller | Peeling | None |
| Example 22 | SCM435 | 0.50 | 0.068 | 800 | None | | |
| Example 23 | SCM435 | 0.50 | 0.068 | 800 | None | | |
| Example 24 | SCM435 | 0.50 | 0.068 | 782 | Power roller | Peeling | None |
| Example 25 | SCM435 | 0.80 | 0.070 | 800 | None | | |
| Example 26 | SCM435 | 0.80 | 0.070 | 800 | None | | |
| Example 27 | SCM435 | 0.80 | 0.070 | 800 | None | | |
| Example 28 | SCM435 | 1.00 | 0.072 | 800 | None | | |
| Example 29 | SCM435 | 1.00 | 0.072 | 800 | None | | |
| Example 30 | SCM435 | 1.00 | 0.072 | 800 | None | | |
| Example 31 | SCM435 | 1.20 | 0.070 | 800 | None | | |
| Example 32 | SCM435 | 1.20 | 0.070 | 800 | None | | |
| Example 33 | SCM435 | 1.20 | 0.070 | 800 | None | | |

TABLE 2

|  | Materials | | Surface | | | | Diameters of |
|---|---|---|---|---|---|---|---|
|  | Material names | Mo contents (%) | nitrogen contents (%) | Test times (hr) | Broken part | Broken states | start-position intervening objects (μM) |
| Example 34 | SCM435 | 1.50 | 0.075 | 800 | None | | |
| Example 35 | SCM435 | 1.50 | 0.075 | 800 | None | | |
| Example 36 | SCM435 | 1.50 | 0.075 | 800 | None | | |
| Example 37 | SCM435 | 1.80 | 0.080 | 800 | None | | |
| Example 38 | SCM435 | 1.80 | 0.080 | 800 | None | | |
| Example 39 | SCM435 | 1.80 | 0.080 | 800 | None | | |
| Example 40 | SCM440 | 0.19 | 0.060 | 800 | None | | |
| Example 41 | SCM440 | 0.19 | 0.060 | 800 | None | | |
| Example 42 | SCM440 | 0.19 | 0.060 | 800 | None | | |
| Example 43 | SCM440 | 0.19 | 0.060 | 756 | Input disk | Peeling | None |
| Example 44 | SCM445 | 0.20 | 0.061 | 800 | None | | |
| Example 45 | SCM445 | 0.20 | 0.061 | 800 | None | | |
| Example 46 | SCM445 | 0.20 | 0.061 | 800 | None | | |
| Example 47 | SCM445 | 0.20 | 0.061 | 786 | Power roller | Peeling | None |
| Example 48 | SCM445 (C = 0.5%) | 0.18 | 0.058 | 800 | None | | |
| Example 49 | SCM445 (C = 0.5%) | 0.18 | 0.058 | 743 | Power roller | Peeling | None |
| Example 50 | SCM445 (C = 0.6%) | 0.18 | 0.058 | 712 | Power roller | Peeling | None |
| Example 51 | SCM445 (C = 0.6%) | 0.18 | 0.058 | 698 | Input disk | Fracture | 54 |

TABLE 2-continued

| Material names | Materials Mo contents (%) | Surface nitrogen contents (%) | Test times (hr) | Broken part | Broken states | Diameters of start-position intervening objects (μM) |
|---|---|---|---|---|---|---|
| Comparative Example 1 | SCM435 | 0 | 0.012 | 64 | Output disk | Peeling | None |
| Comparative Example 2 | SCM435 | 0 | 0.012 | 53 | Input disk | Peeling | None |
| Comparitive Example 3 | SCM435 | 0 | 0.012 | 84 | Output disk | Peeling | None |
| Comparative Example 4 | SCM435 | 0.05 | 0.016 | 95 | Input disk | Peeling | None |
| Comparative Example 5 | SCM435 | 0.05 | 0.016 | 83 | Output disk | Peeling | None |
| Comparative Example 6 | SCM435 | 0.05 | 0.016 | 93 | Input disk | Peeling | None |
| Comparative Example 7 | SCM435 | 0.05 | 0.016 | 102 | Output disk | Peeling | None |
| Comparative Example 8 | SCM435 | 0.10 | 0.02 | 95 | Input disk | Peeling | None |
| Comparative Example 9 | SCM435 | 0.10 | 0.02 | 105 | Output disk | Peeling | None |

As can be understood from Tables 1 and 2, examples of the present invention show satisfactory experimental results. In the case of comparative examples, the amounts of Mo added were small, and even when carbonitriding processing was executed at 1,050° C., this did not lead to satisfactory surface nitrogen contents and the lives were significantly degraded.

In the case of SCM415 and SCM420 wherein the carbon contents in the raw materials are low (those materials are within the ranges of the present invention), the broken states of the life test were all "Fracture." The surfaces of the broken products were observed, and it was found out that a nonmetallic intervening object was present at each crack start position. The intervening objects from which cracking occurred were observed with a scanning electron microscope, and the sizes of them were in the range of 62 to 78 μm. This phenomenon is attributable to the fact that low carbon contents in raw materials increase the incidence of intervening objects.

In examples of the present invention wherein the carbon contents in the raw materials are not less than 0.3% and not more than 0.6%, the peeling was suppressed, and the broken states were "Peeling" of start surfaces. No intervening object was observed at the peeling position. In SCM445 having an increased carbon content of 0.6%, however, the fatigue crack growth rate significantly increased, and cracking occurred, with a relatively small intervening object of 54 μm as a start position.

In view of the above, it is desirable that the carbon contents in the raw materials be equal or more than 0.3% and equal or less than 0.5.

As detailed above, according to examples 1–51, at least one of the input disk, the output disk, and the power roller and the outer ring is formed of a material which contains 0.15 to 2.0% by weight of Mo, and which is subjected to carbonitriding processing executed at a temperature not lower than 1,000° C., and the surface nitrogen content of the finished product is equal to, or greater than 0.04% and less than 0.3%. With this structure, the rolling surfaces of the power roller bearing and the input and output disks are prevented from peeling off and have an improved life against cracking, and these characteristics can be determined in relation to the productivity and the manufacturing cost. Hence, the toroidal continuously variable transmission withstands long use.

EXAMPLE 52

According to Example 52 as well as Examples 53 and 54 to be described later, at least one of the input disk, output disk and power roller differs from that of the conventional transmission. First of all, the materials listed in Table 3 below were melted. Material c in Table 3 was forged into a disk and ground, and then the heat treatment shown in FIG. 2 was executed. To be more specific, the carburization temperature or carbonitriding processing temperature was in the range of 920 to 1060° C. and was adjusted in such a manner that the effective hardened layer (Hv 653) would have a thickness of 3 mm. After the finishing polishing was executed, the metallic structure in a cross section was observed, and the diameter of the maximal-size carbide or nitride in the surface portion was measured. The diameter was measured using a microscope (magnification: 400), and image processing was performed. An area was calculated and converted into a value of a circle. Then, the diameter of the carbide or nitride was obtained.

TABLE 3

| Material Names | Chemical compositions | | | | |
|---|---|---|---|---|---|
| | C | Si | Mn | Cr | Mo |
| a | 0.37 | 0.22 | 0.67 | 1.10 | 0.05 |
| b | 0.36 | 0.24 | 0.68 | 1.07 | 0.10 |
| c | 0.38 | 0.23 | 0.68 | 1.09 | 0.15 |
| d | 0.35 | 0.22 | 0.69 | 1.08 | 0.49 |
| e | 0.37 | 0.21 | 0.66 | 1.11 | 1.00 |
| f | 0.37 | 0.22 | 0.67 | 1.08 | 1.50 |
| g | 0.36 | 0.21 | 0.66 | 1.10 | 1.99 |
| h | 0.37 | 0.24 | 0.69 | 1.12 | 2.50 |

Figure 3:
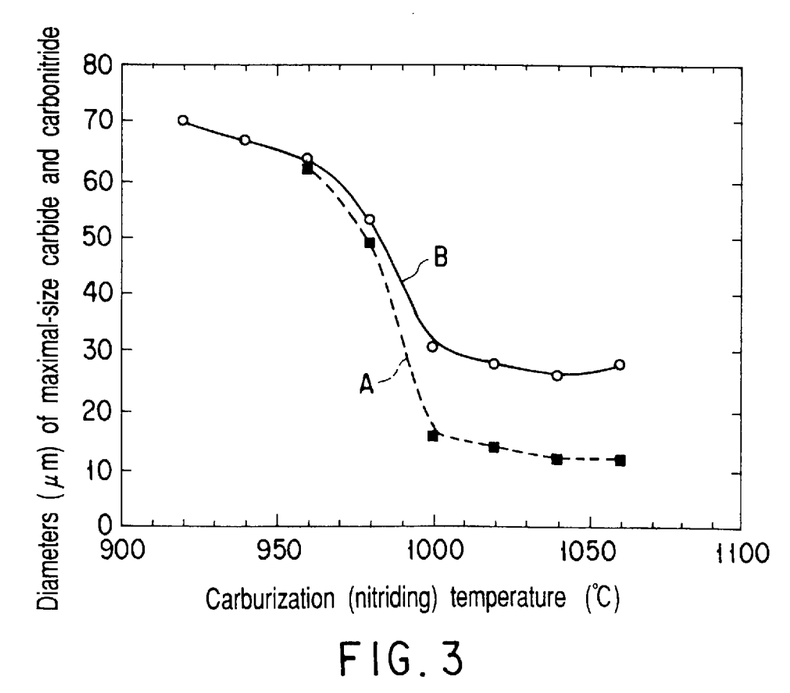
FIG. 3 is a graph showing how a carburization temperature (a carbonitriding processing temperature) is related to a maximal diameter of a carbide or a carbonitride.

FIG. 3 shows relationships how a carburization temperature (a carbonitriding processing temperature) is related to the diameter of the maximal-size carbide or carbonitride. In FIG. 3, curved lines A illustrate carbonitriding processing, curved lines B illustrate carburization. As can be seen from FIG. 3, the diameter of the maximal-size carbide is as small as less than 30 μm in the case where the temperature exceeds 1,000° C. Likewise, the diameter of the maximal-size carbonitride is as small as less than 16 μm in the case where the temperature exceeds 1,000° C.

EXAMPLE 53

Figure 2:
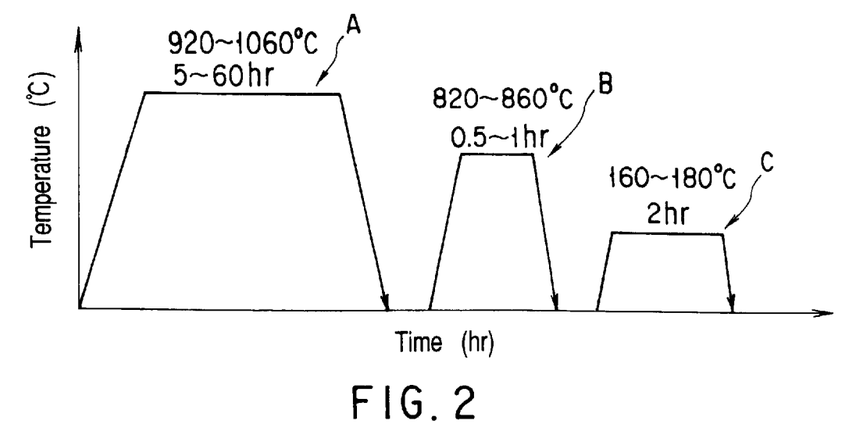
FIG. 2 is a graph showing how the time and temperature are related to each other with respect to structural components of the toroidal continuously variable transmission of the present invention.

Materials a to h in Table 3 were forged into disks and ground, and then the heat treatment shown in FIG. 2 was executed. Where Step A in FIG. 2 is carburization processing, an Rx gas and an enriched gas were used (NH$_3$ gas was added in the case of carbonitriding processing). Step B is hardening, and Step C is annealing. The amount of ammonia remaining after the carbonitriding processing is in the range of 0.01 to 0.2%. In FIG. 2, the carburization or carbonitriding processing is followed by heating to a temperature higher than the A1 transformation point. This thermal hardening process causes recrystallization that produces minute crystal particles, and the carbide and nitrocarbide have to be in the form of minute particles in the preceding step, namely carburization or carbonitriding processing. The carbonitriding processing was executed at 1,000° C., and the nitriding time was determined in such a manner that the effective hardened layer (Hv 653) has a depth of 3 mm. After the subsequent finish working, the metallic structure in a cross section was observed, and the diameter of the maximal-size carbide or carbonitride in the surface portion was measured.

Then, finish working was performed to assemble toroidal continuously variable transmissions.

TABLE 4

| Material Names | Chemical compositions | | | | |
| --- | --- | --- | --- | --- | --- |
|  | C | Si | Mn | Cr | Mo |
| A | 0.38 | 0.23 | 0.70 | 1.09 | 0.20 |
| B | 0.37 | 0.05 | 0.69 | 1.10 | 0.20 |
| C | 0.36 | 2.17 | 0.71 | 1.08 | 0.22 |
| D | 0.38 | 0.24 | 0.3 | 1.08 | 0.19 |
| E | 0.37 | 0.25 | 2.09 | 1.10 | 0.21 |
| F | 0.37 | 0.25 | 0.71 | 0.3 | 0.20 |
| G | 0.37 | 0.23 | 0.69 | 2.11 | 0.20 |
| H | 0.36 | 0.24 | 0.68 | 1.07 | 0.10 |
| I | 0.37 | 0.24 | 0.69 | 1.12 | 2.50 |

Table 5 set forth below shows inspection results of toroidal continuously variable transmissions and tabulates the following items: materials of which to form the transmissions; heat treatment; the surface carbon content; the surface nitrogen content; the diameter of the maximal-size carbide; the diameter of the maximal-size carbonitride; the crystalline grain size in the surface portion; and the thickness of an oxide layer at the grain boundary.

TABLE 5

|  | Material Names | Surface carbon content % | Surface nitrogen content % | Diameter of maximal-size carbide or carbonitride | Crystalline grain size in surface | Test time hr | Broken state |
| --- | --- | --- | --- | --- | --- | --- | --- |
| Example 1 | A | 1.05 | — | 30 | Not less than 8 | 960 | Peeling of input disk |
| Example 2 | A | 1.09 | 0.08 | 16 | Not less than 8 | 1500 | Not broken |
| Comparative example 1 | B | 1.10 | — | 28 | Not less than 8 | 251 | Peeling of input disk |
| Comparative example 2 | C | 1.11 | — | 30 | Not less than 8 | Not tested | Poor workability |
| Comparative example 3 | D | 1.09 | — | 29 | Not less than 8 | 188 | Peeling of input disk |
| Comparative example 4 | E | 1.08 | — | 28 | Not less than 8 | Not tested | Poor workability |
| Comparative example 5 | F | 1.12 | — | 28 | Not less than 8 | 193 | Peeling of power roller |
| Comparative example 6 | G | 1.09 | — | 30 | Not less than 8 | Not tested | Poor workability |
| Comparative example 7 | H | 1.08 | — | 40 | Not less than 8 | 203 | Peeling of input disk |
| Comparative example 8 | I | 1.10 | — | 42 | Not less than 8 | 183 | Peeling of power roller |

Figure 4:
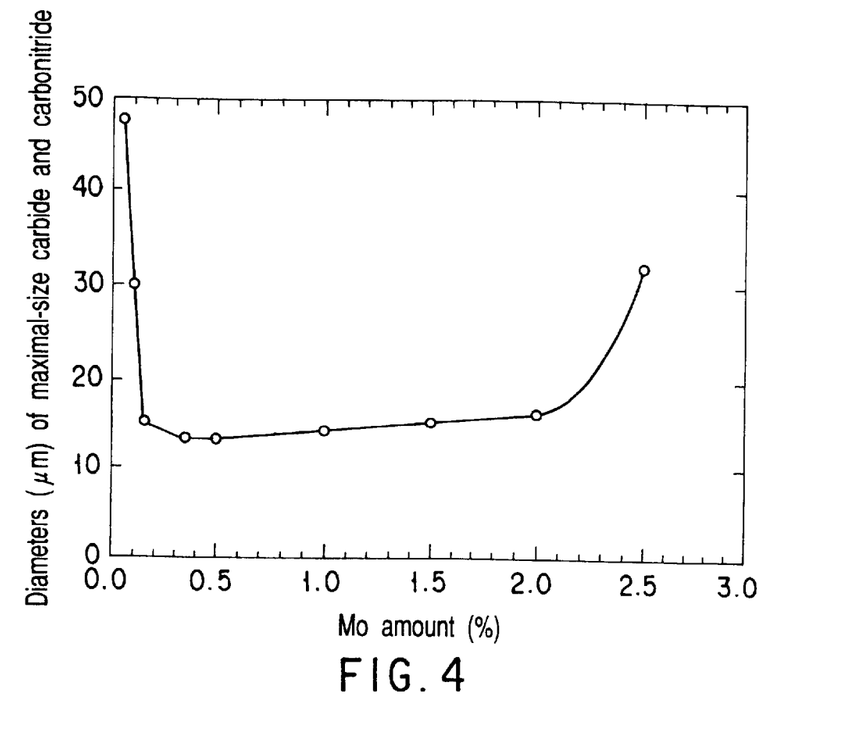
FIG. 4 is a graph showing how an Mo content is related to the diameter of a maximal-size carbide or carbonitride with respect to structural components of the toroidal continuously variable transmission of the present invention.

FIG. 4 is a graph showing how an Mo content is related to the diameter of the maximal-size carbide or carbonitride. As can be seen from FIG. 4, when the Mo content exceeds 0.15%, the diameter of the maximal-size carbide or carbonitride is not larger than 16 μm.

EMBODIMENT 54

Figure 5:
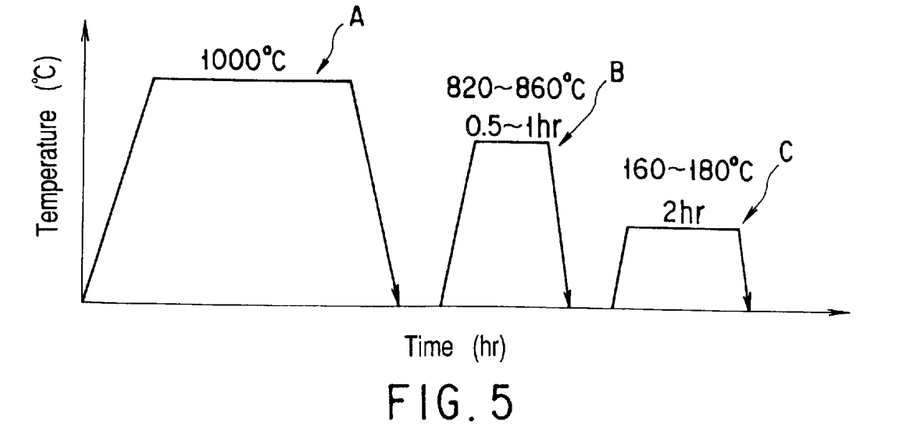
FIG. 5 is a graph showing how the time and temperature are related to each other with respect to structural components of the toroidal continuously variable transmission of the present invention.

First of all, the materials shown in Table 4 were melted. After the raw materials were forged into disks and ground, the heat treatment shown in FIG. 5 was executed. Where Step A in FIG. 5 is carburization processing, an Rx gas and an enriched gas were used (NH$_3$ gas was added in the case of carbonitriding processing). Step B is hardening, and Step C is annealing. The amount of ammonia remaining after the carbonitriding processing was in the range of 0.02 to 0.1%.

The assembled toroidal continuously variable transmissions were subjected to an endurance test under the following conditions:

Test Conditions

Rotating Speed: 4,000 min$^{-1}$
Input Torque: 294 Nm
Used Oil: Synthetic Traction Oil
Temperature of Supplied Oil: 100° C.
Speed Change Ratio: 2.0
Outer Diameter of Disk: 140φ

In the test the vibration of the units was monitored, and the test was continued until the vibration exceeded the predetermined level. The test was ended when 1,000 hours have passed. After the test, the broken conditions were inspected. The test results are shown in Table 5 set forth above.

Figure 6:
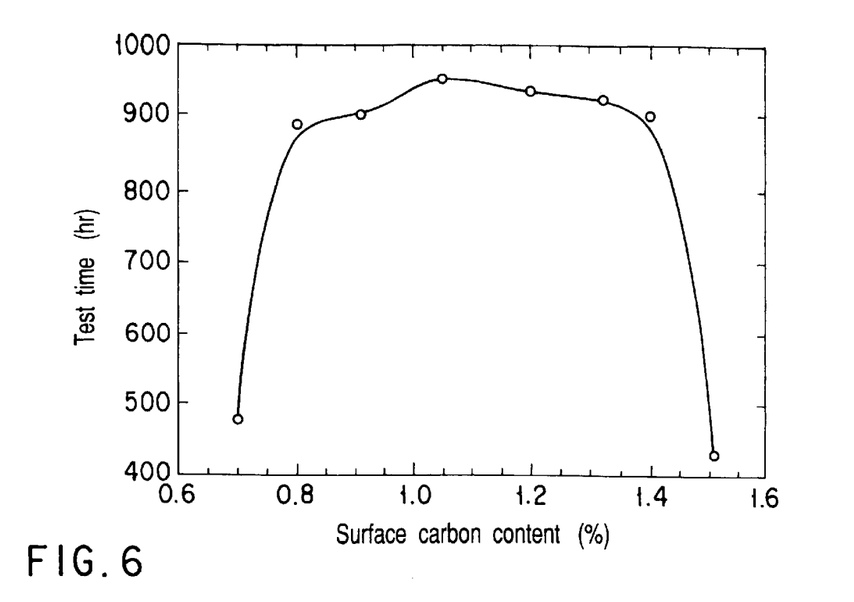
FIG. 6 is a graph showing how the surface carbon content of a structural component of the toroidal continuously variable transmission of the present invention is related to a test time.

FIG. 6 shows results of an endurance test to which toroidal continuously variable transmissions were subjected. The transmissions were manufactured using material A shown in Table 4, and were subjected to carburization under the heat treatment conditions shown in FIG. 5. The transmissions had different surface carbon contents. Each transmission was broken at the track surface of the input disk.

Figure 7:
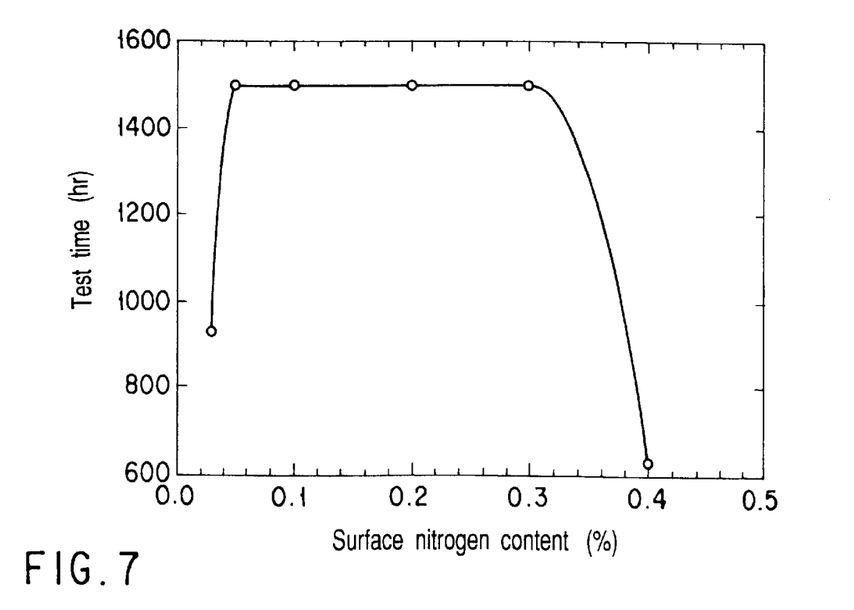
FIG. 7 is a graph showing how the surface nitrogen content of a structural component of the toroidal continuously variable transmission of the present invention is related to a test time.

FIG. 7 shows results of an endurance test to which toroidal continuously variable transmissions were subjected. The transmissions were manufactured using material A shown in Table 4, and were subjected to carbonitriding processing under the heat treatment conditions shown in FIG. 5. The surface carbon contents were in the range of 1.0 to 1.1%. The test was ended when 1,500 hours have passed. In the cases where fracture occurred, peeling occurred at the tracking surfaces of the input disks without exception.

The present invention is applicable not only to the inner rings of power roller bearings, which are in controlling contact with input and output disks, but also to the outer rings of the same.

As detailed above, examples 52–54 do not generate large particles of a carbide in the metallic structure of a disk and a power roller. Therefore, examples 52–54 can provide toroidal continuously variable transmissions which are improved in the life against fatigue and which can be manufactured at low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A toroidal continuously variable transmission system comprising:

an input disk and an output disk which have traction surfaces defined between a small-diameter portion and a large-diameter portion and having an arc-shaped concave section and which are coaxially arranged such that the traction surfaces face each other; and power rollers which are frictionally engaged with the traction surfaces of the input and output disks and transmit a driving force, wherein at least one of the input disk, the output disk and the power rollers is formed of an alloy steel which contains 0.15 to 2.0% by weight of Mo, which is subjected first to carbonitriding processing executed at a temperature not lower than 1,000° C. and then to hardening and tempering, and which has a surface carbon content of 0.8 to 1.4%, and at least one of the input disk, the output disk, a power roller of a power roller bearing and an outer ring thereof has a carbon content which falls within a range of 0.3 to 0.5%.

2. A toroidal continuously variable transmission system comprising:

an input disk and an output disk which have traction surfaces defined between a small-diameter portion and a large-diameter portion and having an arc-shaped concave section and which are coaxially arranged such that the traction surfaces face each other; and power rollers which are frictionally engaged with the traction surfaces of the input and output disks and transmit a driving force, wherein at least one of the input disk, the output disk and the power rollers is formed of an alloy steel which contains 0.15 to 2.0% by weight of Mo, which is subjected first to carburization or carbonitriding processing executed at a temperature not lower than 1,000° C. and then to hardening and tempering, and which has a surface carbon content of 0.8 to 1.4%, and a surface nitrogen concentration falls within the range of 0.04 to 0.3%.

3. A toroidal continuously variable transmission according to claim 2, wherein at least one of the input disk, the output disk, and the power roller and outer ring of a power roller bearing has a carbon content equal or more than 0.3% and equal or less than 0.5%.

4. A method for manufacturing a toroidal continuously variable transmission system including: an input disk and an output disk which have traction surfaces defined between a small-diameter portion and a large-diameter portion and having an arc-shaped concave section and which are coaxially arranged such that the traction surfaces face each other, and power rollers which are frictionally with the traction surfaces of the input and output disks and transmit a driving force, the method comprising: forming at least one of the input disk, the output disk and the power rollers by use of an alloy steel which contains 0.15 to 2.0% by weight of Mo; executing carbonitriding processing at a temperature not lower than 1,000° C.; and then executing hardening and tempering, such that a surface carbon content is within the range of 0.8 to 1.4%, and at least one of the input disk, the output disk, a power roller of a power roller bearing, and an outer ring thereof has a carbon content which falls within a range of 0.3 to 0.5%.

5. A method for manufacturing a toroidal continuously variable transmission system: including an input disk and an output disk which have traction surfaces defined between a small-diameter portion and a large-diameter portion and having an arc-shaped concave section and which are coaxially arranged such that the traction surfaces face each other, and power rollers which are frictionally engaged with the traction surfaces of the input and output disks and transmit a driving force, the method comprising: forming at least one of the input disk, the output disk and the power rollers by use of an alloy steel which contains 0.15 to 2.0% by weight of Mo; executing carburization or carbonitriding processing at a temperature not lower than 1,000° C. and then executing hardening and tempering, such that a surface carbon content falls within the range of 0.8 to 1.4%, and a surface nitrogen concentration falls within the range of 0.04 to 0.3%.

6. A method for manufacturing a toroidal continuously variable transmission according to claim 5, wherein at least one of the input disk, the output disk, and the power roller and outer ring of a power roller bearing has a carbon content equal or more than 0.3% and equal or less than 0.5%.

* * * * *

UNITED STATES PATENT AND TRADEMARK OFFICE
CERTIFICATE OF CORRECTION

PATENT NO.    : 6,659,909 B2          Page 1 of 1
DATED         : December 9, 2003
INVENTOR(S)   : S. Okita et al.

It is certified that error appears in the above-identified patent and that said Letters Patent is hereby corrected as shown below:

<u>Column 18,</u>
Line 29, "frictionally with" should read -- frictionally engaged with --

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,659,909 B2
DATED         : December 9, 2003
INVENTOR(S)   : S. Okita et al.

It is certified that error appears in the above-identified patent and that said Letters Patent is hereby corrected as shown below:

Column 18,
Lines 17 and 58, "transmission" should read -- transmission system --
Lines 21, 22 and 61 (both occurrences) "equal or" should read -- equal to or --

Signed and Sealed this

Thirteenth Day of April, 2004

JON W. DUDAS
*Acting Director of the United States Patent and Trademark Office*